United States Patent [19]

Dudko et al.

[11] 3,836,292

[45] Sept. 17, 1974

[54] PLANETARY FLUID MOTOR WITH INTERNAL MESHING

[76] Inventors: Daniil Andreevich Dudko, pereulok Mechnikova, 3, kv. 7; Mikhail Danilovich Sur, ulitsa Vladimirskaya, 98, kv. 52, both of Kiev, U.S.S.R.

[22] Filed: Feb. 23, 1972

[21] Appl. No.: 228,701

[52] U.S. Cl.................... 418/63, 418/186, 418/188
[51] Int. Cl. .............................................. F01c 1/02
[58] Field of Search.......... 418/54, 63, 66, 186–188

[56] References Cited
UNITED STATES PATENTS

| | | | |
|---|---|---|---|
| 1,693,302 | 11/1928 | Lavergne | 418/188 |
| 3,367,239 | 2/1968 | Takagi | 418/54 |

*Primary Examiner*—C. J. Husar
*Attorney, Agent, or Firm*—Holman & Stern

[57] ABSTRACT

A planetary fluid motor with internal meshing in which there is provided a satellite pinion and two central or differential gears namely a stationary gear and a rotatable gear. Both differential gears are simultaneously caused to mesh and engage the satellite pinion, defining therewith a working space. The working space is divided into two zones with one zone communicating with a means supplying pressurized working fluid and the other zone communicating with a working fluid discharge means.

4 Claims, 4 Drawing Figures

PLANETARY FLUID MOTOR WITH INTERNAL MESHING

BACKGROUND OF THE INVENTION

The present invention relates to general engineering technology, and more particularly, to planetary hydraulic and pneumatic motors, to be hereinafter referred to as fluid motors, with internal meshing.

Prior Art

There are known planetary fluid motors with internal meshing, which comprise a stationary internally-toothed central, or differential gear meshing with a satellite pinion. The latter is rotatably mounted on an eccentric journal means of a pinion carrier and is operatively connected with the output shaft of the motor through motion transmitting means, e.g. crank-and-connecting rod means, universal joints, couplings, etc. At the areas free from the meshing engagement, the satellite pinion and the stationary differential gear define therebetween a working space communicating with the supply of the pressurized working fluid.

In these known fluid motors, the pressurized working fluid is supplied to the working space from an end face thereof.

However, these known fluid motors have relatively small transmission ratios and develop a relatively limited output torque, which necessitates the incorporation of additional step-down reducers, in order to reduce the torque applied to the shaft of the associated drive or actuating mechanism. Thus, the overall dimensions and the weight of the drive or actuator assembly are substantially increased.

Moreover, these known fluid motors feature a relatively poor volume efficiency factor, on account of the working fluid being supplied to the working space from the end face thereof, because the centrifugal forces developed by the satellite pinion oppose the complete filling of the working space by the working fluid.

The asymmetry of the eccentric pinion carrier of these known fluid motors is responsible for the development therein of a centrifugal inertia resulting in additional loads acting upon the bearings of the pinion carrier and vibration.

OBJECTS AND SUMMARY OF THE INVENTION

It is an object of the present invention to increase the volume efficiency of the fluid motors.

It is another object of the present invention to increase the torque developed at the output shaft of the fluid motors.

It is still another object of the present invention to reduce vibration in the operation of the fluid motors.

With these and other objects in view, the present invention resides in a planetary fluid motor comprising a rotatable differential internally toothed gear rigidly connected with an output shaft of said motor, said gear adjoining a stationary differential gear of said motor, of said differential gears simultaneously meshing with a satellite pinion and defining therewith, a working space divided into two zones of which one zone communicates with a supply of the pressurized working fluid and the other zone with the discharge of said working fluid.

With a fluid motor constructed in the above manner, the torque developed at the output shaft thereof is increased, owing to the great transmission ratio from the pinion carrier to the output shaft; the structure of the motor is considerably simplified by the rotatable differential gear taking place of the former transmission means; and the volume efficiency of the motor is also increased, because in this motor complete filling of the working zones with the working fluid is ensured.

It is expedient for a planetary fluid motor, constructed in accordance with the invention, to include discs limiting said working space in the longitudinal direction by each one of said discs adjoining the respective end face of said satellite pinion and the end face of the respective one of said differential gears, with said working space being limited in the radial direction by an arcuate feather member of said pinion carrier, mounted in opposition to the central axis of the eccentric journal means of said pinion carrier and extending within the interteeth portion of said motor across the entire width of said differential gears and of said satellite pinion, and said working space being limited in the direction diametrally opposite to said radial direction by the engagement contact of said pinion with said gears.

The above-described limiting of the working space brings about a more effective use of the side (peripheral) surface of the satellite pinion, which leads to an increased torque applied to the pinion carrier.

It is further advisable for said discs to have their internal diameter exceeding that of the teeth base circle of said differential gear and for said discs to be rigidly mounted on said pinion carrier.

The mounting of the discs on the pinion carrier brings about better balancing of the satellite pinion – pinion carrier assembly, thus reducing the adverse effects of the centrifugal inertia forces which might otherwise result in additional loads acting upon the bearings, and vibration.

It is still further advisable for said satellite pinion to have a single toothed rim, with the axial width of the teeth of said satellite pinion being equal to the total axial width of the teeth of said two differential gears.

The above structure of the satellite pinion simplifies the structure of the fluid motor as a whole; simplifies production and assemblage of the fluid motor and improves the geometric balance of the motor, with this latter factor resulting in reduced inertia.

A planetary fluid motor, constructed in accordance with the present invention, may be used to a great advantage, e.g. in welding equipment, for example as the means effecting the feed of the electrode wire in semi-automatic welding machines; it may also be incorporated in various lightweight welding machines which make use of cooling water and compressed air and, in welding installations adapted to operate at elevated temperatures, etc.

It is particularly advantageous to incorporate fluid motors constructed in accordance with the invention in the holders, or "guns" of semi-automatic welding machines operating on the "pull" principle.

A planetary fluid motor, constructed in accordance with the present invention may also be widely used in various branches of engineering in general, wherever such features as compact size, small weight, infinite adjustment within a wide range of the rotational speed of the shaft of an actuating mechanism are essential, e.g. in liquid- and air-operated hand tools.

A fluid motor constructed in accordance with the present invention offers a great ratio of the reduction of the speed of the output shaft and has been found to feature a high mechanical efficiency factor (as high as 0.8 to 0.9) with transmission ratios from 10:1 to 100:1.

Other objects and advantages of the present invention will be made apparent in the following detailed description of an embodiment thereof, with reference being had to the accompanying drawings, wherein:

DETAILED DESCRIPTION OF THE INVENTION

Figures 1, 2:
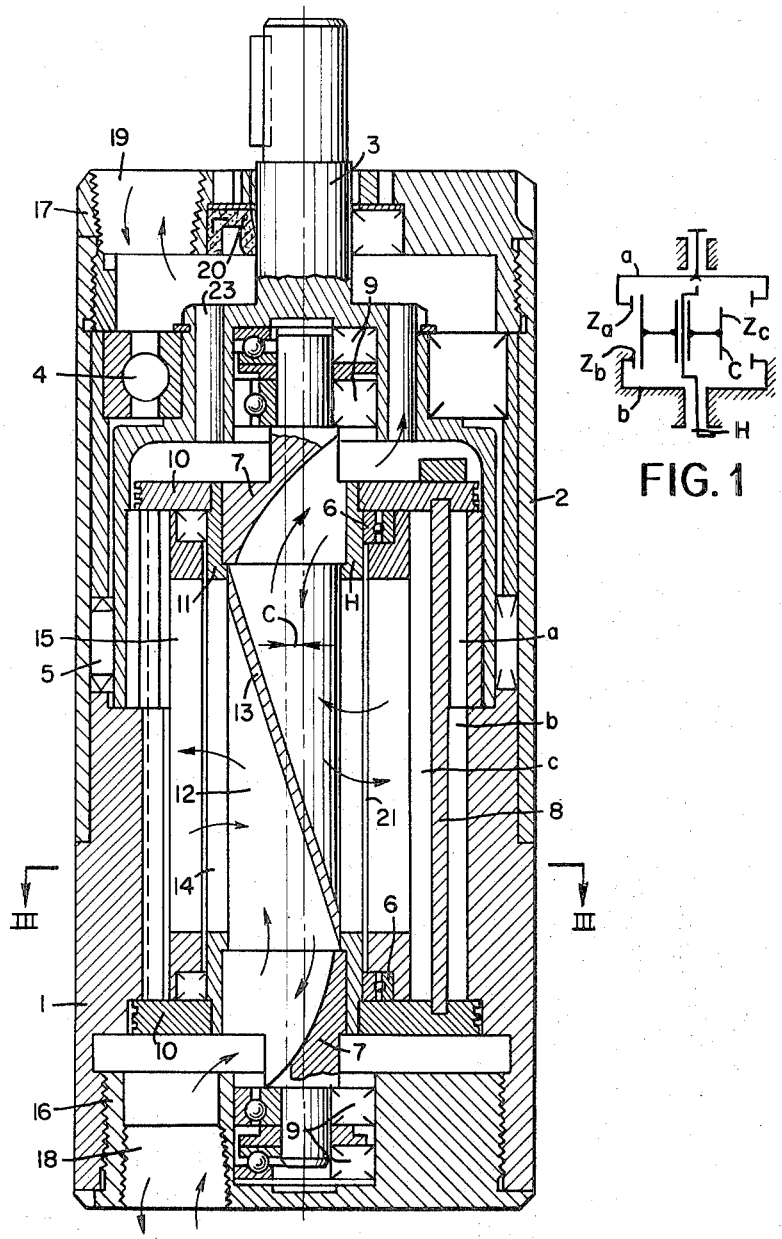
FIG. 1 is the drive diagram of a fluid motor embodying the invention.
FIG. 2 is a schematic longitudinal sectional view of the fluid motor embodying the invention.

In accordance with the appended drive diagram (FIG. 1), the transmission ratio of the herein disclosed fluid motor can be found from the following general formula:

$$i^b_{Ha} = \frac{1}{1 - \frac{Z_b}{Z_c} \cdot \frac{Z_c}{Z_a}} = \frac{Z_a}{Z_a - Z_b},$$

where $i_{Ha}^b$ is the transmission ratio of the fluid motor with the stationary differential gear $b$ and transmission of the motion from the carrier $H$ to the differential gear $a$;

$Z_a$ is the number of the teeth of the internally-toothed movable differential gear $a$;

$Z_b$ is the number of the teeth of the internally-toothed stationary differential gear $b$;

$Z_c$ is the number of the teeth of the satellite pinion $c$.

With the difference between the respective numbers of the teeth of the two differential gears equal to one, i.e. $Z_b - Z_a = 1$, the transmissiton ratio becomes equal to: $i_{Ha}^b = Z_a$, i.e. it becomes equal to the number of the teeth of the movable, or rotatable differential gear rigidly mounted on the output shaft of the fluid motor. The greater is the difference $Z_b - Z_a$, the smaller is the transmission ratio. Taking into consideration the geometry involved, the difference $Z_b - Z_a$ can be made equal to three or four, whereby it becomes possible to vary the transmission ratio within certain limits.

Referring now more particularly to the appended drawings, a housing 1 of the fluid motor is integral with a stationary differential gear $b$. Press-fit about the housing 1 is a sleeve 2 receiving thereinside a rotatable differential gear $a$ integral with an output shaft 3 of the fluid motor, mounted for rotation in two antifriction bearings 4 and 5.

A satellite pinion $c$ is rotatably mounted by means of antifriction bearings 6 on an eccentric journal 7 of a pinion carrier $H$. On the side thereof, opposite to the central axis of the eccentric journal 7, the pinion carrier H is provided with an arcuate feather 8 which fits into the space left between the respective teeth of the satellite pinion $c$ and of the differential gears $a$ and $b$. The feather 8 is defined by three circular arcs having three different radii, viz. the internal radius having the center thereof coinciding with the central axis of the eccentric journal 7 of the pinion carrier H, and the two external radii both extending from the points lying on the longitudinal axis of the motor, with one of the two external radii corresponding to the crest diameter of the stationary differential gear $b$, and the other one corresponding to the crest diameter of the rotatable differential gear $a$.

Mounted for rotation in antifriction bearings 9, each comprising a radial ball bearing and a thrust ball bearing, is the pinion carrier H which is constituted by two eccentric journals 7 having each rigidly attached thereto a face disc 10 adjoining the respective end faces of the satellite pinion $c$ and of the differential gear, and a hollow central tube 11. The face discs 10 have cut therein profile grooves receiving therein the respective ends of the feather 8.

Figure 3:
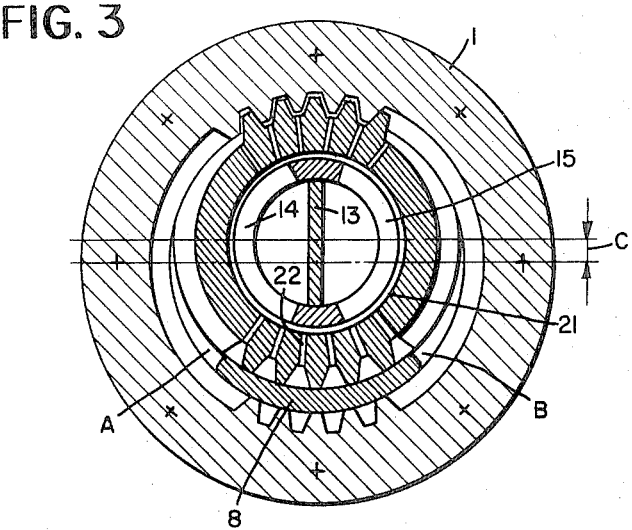
FIG. 3 is a cross-sectional view taken along the line III—III of FIG. 2, the view looking in the direction of the arrows.

A through central bore 12 of the tubular part 11 of the pinion carrier H is divided by an inclined partition 13, opposite to which the tube 11 of the pinion carrier H has cut therethrough a pair of opposing ports 14 and 15 which can be seen in FIG. 3.

The housing 1 and the sleeve 2 have threaded into the respective free faces thereof, a pair of externally threaded closures 16 and 17 having formed therethrough respective threaded openings 18 and 19 for the supply and discharge of the working fluid, i.e. either of the working liquid or of the pressurized gas (the connections for the supply and discharge of the working fluid are not shown in the drawings). The closure 17 has mounted therein a seal 20 engaging the output shaft 3 of the fluid motor.

In the design of the fluid motor minimal annular clearances are guaranteed between the satellite pinion $c$ and the tube 11 of the pinion carrier H, between the arcuate feather 8 and the respective crest peripheries of the satellite pinion $c$ and of the differential gears $a$ and $b$; minimal face clearances are likewise guaranteed between the respective adjacent faces of the satellite pinion $c$, of the discs 10 and of the differential gears $a$ and $b$, with all of the clearances positively preventing any direct contact of the adjoining respective metal surfaces of the abovementioned parts.

The fluid motor operates as follows:

The working fluid is supplied under pressure through the inlet opening 18 in the closure 16 of the housing 1 into the central bore, 12 of the pinion carrier H. From this bore the working fluid under pressure finds its way through the side port 14, and through radial grooves 22 which can be seen in the FIG. 3 into the inter-teeth high-pressure zone A. The high-pressure zone A is insulated from the low-pressure zone B in the longitudinal direction by the face discs 10 of the pinion carrier H and in the radial direction by the arcuate feather 8 and by the engagement contact of the differential gears $a$ and $b$ with the satellite pinion $c$.

In other words, a free outflow of the working fluid from the high-pressure working zone A is positively prevented by the engagement of the teeth of the satellite pinion $c$ with the respective teeth of the differential gears $a$ and $b$, by the face clearances between the satellite pinion $c$ and the face discs 10, by the face clearance between the differential gears $a$ and $b$, by the annular clearances between the arcuate feather 8 and the crest surfaces, respectively, of the satellite pinion c and of the differential gears a and b. These clearances being but minimal, they offer a great resistance to the flow of the working fluid from one working zone into the other one. In other words, minimal annular clearances are guaranteed between the satellite pinion c and the tube 11 of the pinion carrier H, with such clearance providing a reliable labyrinth seal precluding the by-passing of the working fluid under pressure from the port 14 to the port 15.

The pressure differential between the working zones A and B acts upon the surface of the satellite pinion c which bears, through the antifriction bearings 6, upon the pinion carrier H which, as already explained, is mounted with the eccentricity C.

Owing to this eccentricity C, the pinion carrier H has applied thereto a positive torque which is transmitted through the rotatable differential gear a to the output shaft 3.

The satellite pinion c, while being imparted an orbital motion about the longitudinal central axis of the fluid motor, transfers, in the grooves between its teeth, the working fluid into the low-pressure working zone B, from which this fluid flows through the radial grooves 22 in the satellite pinion c, the port 15 in the pinion carrier H, through the central bore 12, the opening 23 in the output shaft 3 and the opening 19 in the closure 17 to drain.

If the working fluid is supplied under pressure into the zone B instead of the zone A, the last-mentioned zone becomes the low-pressure, or drain zone, and the rotation of the output shaft of the fluid motor is reversed.

Figure 4:
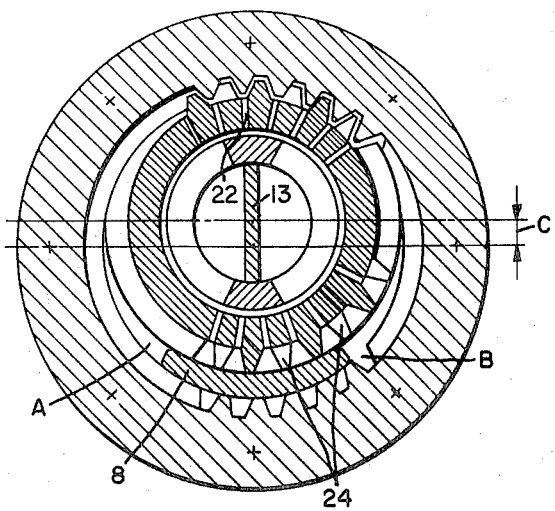
FIG. 4 is a cross-sectional view similar to FIG. 3, of an alternative structure of the satellite pinion.

According to a modified embodiment of the fluid motor with internal meshing, the alternating teeth of the satellite pinion c have cut therein, in the central portion thereof, grooves 24 extending down to the base diameter of the teeth (FIG. 4).

These grooves 24 in the teeth of the satellite pinion c increase the volume of the working fluid transferred by the satellite pinion, and thus provide for the increased capacity of the fluid motor and for the increased volume efficiency thereof. On the other hand, the presence of these grooves does not hinder the advantages offered by internally meshing gear couples with a great number of the teeth of the meshing gears, i.e. the smoothness of their engagement and the increased mechanical efficiency.

What is claimed is:

1. A planetary fluid motor with internal meshing, comprising: a pinion carrier having eccentric journal means; a satellite pinion rotatably mounted on said eccentric journal means of said pinion carrier; an outout shaft for said motor; a stationary internally toothed differential gear meshing with said satellite pinion; a rotatable internally toothed differential gear rigidly connected with said output shaft and meshing with said satellite pinion; said rotatable and stationary differential gears defining at an area free from said meshing engagement, a working space divided into two zones, one zone being connected for supply thereinto of a pressurized fluid acting upon said satellite pinion, the other of said two zones being connected for discharge of said working fluid therefrom; and at least two communication means, one of said communicating means establishing said connection for the supply of said working fluid and the other of said communicating means establishing said connection for the discharge of said working fluid.

2. The planetary fluid motor with internal meshing, according to claim 1, comprising discs extending laterally of said working space and limiting said working space in a longitudinal direction by each one of said discs adjoining the respective end face of said satellite pinion and the end face of the respective one of said two differential gears, said working space being limited in a radial direction by an arcuate feather member of said pinion carrier, mounted in opposition to a central axis of said eccentric journal means of said pinion carrier and extending within the inter-teeth portion of said motor across the entire width of said differential gears and of said satellite pinion, with said working space being limited in a direction diametrically opposite to said radial direction by the engagement contact of said pinion with said gears.

3. The planetary fluid motor with internal meshing, according to claim 2 wherein the external diameter of said discs is greater than the diameter of the teeth base circle of said differential gears, with said discs being rigidly mounted on said pinion carrier.

4. The planetary fluid motor with internal meshing, according to claim 1, wherein said satellite pinion has a single toothed rim, the axial width of the teeth of said satellite pinion being equal to the total axial width of the teeth of said two differential gears.

* * * * *